United States Patent [19]

Huard et al.

[11] Patent Number: 5,576,255
[45] Date of Patent: Nov. 19, 1996

[54] REFRACTORY SAND COMPOSITION

[75] Inventors: Yvan Huard, Thetford-Mines; Gilles Mathieu, Aylmer; Jay Aota, Kanata, all of Canada

[73] Assignee: Les Sables Olimag, Inc., Quebec, Canada

[21] Appl. No.: 527,552

[22] Filed: Sep. 13, 1995

Related U.S. Application Data

[63] Continuation-in-part of Ser. No. 257,030, Jun. 8, 1994, Pat. No. 5,453,408, which is a continuation of Ser. No. 839,508, Feb. 21, 1992, Pat. No. 5,374,593.

[51] Int. Cl.$^6$ .......................... C04B 35/04; C04B 35/16
[52] U.S. Cl. .................. 501/122; 501/101; 501/108; 501/155; 423/331
[58] Field of Search ............................. 501/99, 101, 108, 501/109, 122, 123, 133, 154, 155; 106/38.9; 423/331

[56] References Cited

U.S. PATENT DOCUMENTS

| | | | |
|---|---|---|---|
| 4,476,235 | 10/1984 | Chevalier-Bultel | 501/155 |
| 4,497,901 | 2/1985 | Ohtsuki et al. | 501/101 |
| 4,604,140 | 8/1986 | Lalancette et al. | 106/38.9 |
| 4,985,164 | 8/1986 | Delvaux et al. | 423/331 |
| 5,006,490 | 4/1991 | Logan et al. | 501/155 |
| 5,127,939 | 7/1992 | Panigrahy et al. | 75/323 |
| 5,374,593 | 12/1994 | Huard et al. | 501/122 |
| 5,453,408 | 9/1995 | Huard et al. | 501/122 |

FOREIGN PATENT DOCUMENTS

| | | |
|---|---|---|
| 1208918 | 8/1986 | Canada. |
| 1216403 | 1/1987 | Canada. |
| 2165784 | 8/1973 | France. |
| 2398704 | 2/1979 | France. |

OTHER PUBLICATIONS

Aitcin, P–C, "Refractory Applications of Basic Tailings from Quebec Asbestos Mines", *American Ceramic Society Bull.*, vol. 61, No. 8, 1987, pp. 851–853 (no month).

Chien, Y. T., et al. "Preparation and Performance of Packing Sands for Sliding Gate Systems for Steel Laddles", *Ironmaking and Steelmaking*, vol. 9, No. 6, 1982, pp. 252–257 (no month).

Garlick, C. et al. "The Effect of Sand Properties at High Temperature on Ladle Free Opening Performance", *1990 Steelmaking Conference Proceedings* pp. 427–433 (no month).

Fujii, K. et al., "100% Free Opening Without Oxygen Blowing for Sliding Gate System of Ladle", *70th Steelmaking Conf. Proc.* vol. 70, 1987, pp. 63–68 (no month).

Harbison, Walker, "Modern Refractory Practice", (no month), 1961, Harbison–Walker Refractory Company, p. 172.

Habashi, F., "Advances in Asbestos Science," Paper presented at International Conference on Asbestos Products, Juala Lumpur, Malaysia, Nov. 1991.

Cox, F. S. et al., "Ladle Sands: Testing and Application", *1990 Electric Furnace Conference Proceedings*, pp. 451–458 (no month).

Benefiel, J. A. et al., "Development of Operating Practices for Improved Free–Open Performance of Slide Gate Ladles", *Iron and Steelmaker* No. 7, Jul. 1994, pp. 38–44.

*Primary Examiner*—Karl Group
*Assistant Examiner*—Michael Marcheschi
*Attorney, Agent, or Firm*—Nilles & Nilles, S.C.

[57] ABSTRACT

Compositions for refractory materials and methods for providing the compositions are described. A synthetic forsterite-rich refractory sand composition includes a mixture. The mixture includes: a) a carbon bridging agent, the carbon bridging agent being present in the mixture in a proportion of from approximately 5 to approximately 15 percent by weight of the mixture; and b) a synthetic forsterite-rich sand, the synthetic forsterite-rich sand being free-flowing, having a $MgO:SiO_2$ weight ratio of at least approximately 1.2, a specific gravity of approximately 3 g/cm$^3$, a void volume of less than approximately 50 percent by volume of the synthetic forsterite-rich sand, and a fusion point of at least approximately 1610° C., wherein i) at least approximately 50 percent by weight of the synthetic forsterite-rich sand is forsterite, and ii) from approximately 3 to approximately 27 percent by weight of the synthetic forsterite-rich sand is maghemite. The compositions and methods provide advantages in that the resulting refractory product have suitable characteristics with respect to size distribution, packing ability, thermal resistance and sintering properties for utilization as ladle sand or for similar refractory uses.

20 Claims, 4 Drawing Sheets

REFRACTORY SAND COMPOSITION

CROSS-REFERENCES TO RELATED APPLICATIONS

This application is a continuation-in-part of U.S. Ser. No. 08/257,030, filed Jun. 8, 1994, now U.S. Pat. No. 5,453,408, the entire contents of which are hereby expressly incorporated by reference into the present application, which in turn is a continuation of U.S. Ser. No. 07/839,508, filed Feb. 21, 1992, now U.S. Pat. No. 5,374,593, the entire contents of which are also hereby expressly incorporated by reference into the present application.

BACKGROUND OF THE INVENTION

1. Field of the Invention

This invention relates to refractory materials produced from tailings from asbestos mines. More specifically, this invention yields such refractory materials which are suitable for heat intensive metallurgical applications, such as for example in the taphole nozzles of sliding gate systems in steel mill ladles.

2. Discussion of the Related Art

Asbestos deposits normally occur in certain types of silicate rock which contain only about 5 to 10 percent by volume of asbestos fibres. Consequently, separation of the fibres from asbestos ore leaves large quantities of unwanted tailings which accumulate at or near extraction or processing sites. There is therefore a need to find novel commercial applications for these by-products of asbestos mining and refining operations.

Chrysotile asbestos tailings normally contain a substantial proportion of hydrated magnesium silicates referred to as serpentine. Other components which occur with serpentine rock are brucite $Mg(OH)_2$ and hematite-magnetite $(Fe_2O_3Fe_3—O_4)$. Deposits of nickel may also occur in the rock. Known potential uses for asbestos tailings include the use of the tailings as a source of nickel extracted by magnetic separation of nickel- and iron-rich magnetic components; the transformation of the tailings into mineral wool by melting with carbon and forming fibers by blowing air through the resulting molten silicate; and the use of the tailings as a source of magnesium and/or magnesium compounds obtained by acid leaching and crystallization.

It is also known to calcine serpentine in order to produce sintered angular shaped granules useful as sandblasting or heat accumulating material, or to produce granular products useful as foundry mold sands. However, conventional calcination methods give rise to a number of drawbacks. For example, the conventional process of calcining serpentine results in the production of a synthetic harzburgite rich in a pyroxene of the silicate group and commonly referred to as enstatite. Enstatite is further subdivided into protoenstatite and clinoenstatite depending on its resulting crystallographic structure. However, these products have relatively low melting or softening points (less than 1,600° C.), and are therefore not useful as refractory materials for particularly high temperature operations, e.g. in the production of steel which involves exposure to temperature in the region of 1,700° C. for several hours.

The known methods of serpentine calcination normally involve heating the serpentine to a temperature of about 1,300° C., whereby the following chemical reactions are said to take place:

(i) dehydration encountered at 600° to 780° C. to form an anhydrous magnesium silicate:

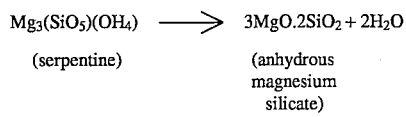

$$Mg_3(SiO_5)(OH)_4 \longrightarrow 3MgO.2SiO_2 + 2H_2O$$

(serpentine)      (anhydrous magnesium silicate)

(ii) conversion of the anhydrous magnesium silicate into forsterite $(Mg_2SiO_4)$ and free silica $(SiO_2)$, which starts to occur at approximately 800° to 900° C.:

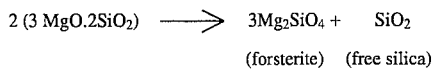

$$2(3 MgO.2SiO_2) \longrightarrow 3Mg_2SiO_4 + SiO_2$$

(forsterite)    (free silica)

(iii) reaction of forsterite with free silica above 1,000° C. thereby forming enstatite $(MgSiO_3)$:

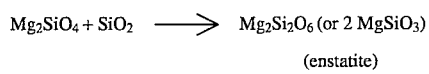

$$Mg_2SiO_4 + SiO_2 \longrightarrow Mg_2Si_2O_6 \text{ (or } 2 MgSiO_3\text{)}$$

(enstatite)

As previously stated, such enstatite-rich products can find application as, for example, foundry mold sands or backing sand mixes. However, the product is unsuitable for higher temperature applications in which the product is required to have superior refractory properties, for example, in steel or other high temperature smelting operations. More specifically, enstatite rich-products are unsuitable as ladle and ladle nozzle sands currently utilized, for example, in steel mills and foundries because the product is unable to withstand the necessary temperatures and holding times involved.

Sands currently used in steel mill ladles are mostly silica, zircon and chromite based. Although such products have good granulometry, packing density and purity, they are expensive to produce. Moreover, many of these products have various degrees of toxicity. The manipulation and use of many of such products causes the liberation of silicious dusts. Such dusts are known to engender, among workers exposed, thereto, the serious medical condition known as silicosis.

To produce a synthetic olivine from asbestos tailings suitable for extremely high temperature applications, it is theorized that a high proportion of forsterite $(Mg_2SiO_4)$ should be produced in the final product. This is because of the favorable refractory properties of forsterite compared to enstatite and because the fusion point of forsterite is much higher than that of enstatite. Aitcin, in Am. Ceramic Society Bull., Vol. 61, No. 8 (1982), pp. 857 to 860, teaches calcining and sintering nonmagnetic portions of asbestos tailings to produce a refractory product. A process is described whereby fine asbestos tailings are fired at 1,550° C. However, the resulting refractory product is rich in enstatite. The forsterite content of the refractory product will be a function of the basicity index $(MgO:SiO_2)$ of the asbestos tailings. Hence, the forsterite content of the final product is limited by the basicity index of the raw material. For example, a typical fusion product of calcined asbestos tailings consists of 33 percent by volume of forsterite and 54 percent by volume of enstatite, the remainder being essentially hematite $(Fe_2O_3)$.

Accordingly, there remains a need to realize an efficient method of producing a synthetic olivine composition from asbestos tailings for applications such as, for example, high temperature ladle nozzle sands, which method will overcome the drawbacks of the prior art.

A first object of the present invention is to provide a process of treating asbestos tailings in order to convert such tailings into a commercially useful product.

A second object of the invention is to provide a process of producing, from asbestos tailings or other ores of similar composition, synthetic olivine sands having good refractory characteristics at very high temperatures, such as those encountered during the manufacture and treatment of steel in steel mill foundries.

Another object of the invention is to produce a forsterite-rich product from a serpentine mineral or from a previously calcined serpentine mineral containing enstatite.

Another object of the invention is to provide a novel refractory material suitable for use at very high temperatures.

Yet another object of this invention is to provide a novel nontoxic sand exhibiting higher refractoriness, greater density and a lower coefficient of thermal expansion than many conventional, high temperature foundry sands.

SUMMARY OF THE INVENTION

According to one aspect of the present invention, there is provided a process of producing refractory material of high forsterite content, which comprises: heating serpentine-containing asbestos tailings, or an enstatite-containing product produced by calcining serpentine-containing asbestos tailings, with magnesium oxide or a magnesium oxide precursor at a temperature of about 1,200° C. or above for a time sufficient to form said forsterite-rich product.

According to another aspect of the present invention, there is provided a process for producing a synthetic refractory sand composition having a mixture of a carbon bridging agent and a synthetic forsterite-rich sand, said carbon bridging agent being present in said mixture in a proportion of from approximately 5 to approximately 15 percent by weight of said mixture, said synthetic refractory sand being free-flowing, having i) at least approximately 50 percent by weight forsterite and ii) from approximately 3 to approximately 27 percent by weight maghemite, and having i) a $MgO:SiO_2$ weight ratio of at least approximately 1.2, ii) a specific gravity of approximately 3 $g/cm^3$, iii) a void volume of less than approximately 50 percent and iv) a fusion point of at least approximately 1,610° C., said process of producing a synthetic refractory sand composition comprising the steps of: (a) agglomerating 1) a mixture comprising i) a particulate starting material selected from the group consisting of serpentine-containing asbestos tailings and an enstatite-containing product produced by calcining serpentine-containing product, said serpentine-containing product being produced by calcining serpentine-containing asbestos tailings and ii) from approximately 10 to approximately 25 percent, based on the total weight of mixture, of magnesium oxides or precursors of magnesium oxides with 2) an aqueous binder solution; (b) calcining said agglomerates at a temperature of from approximately 1,200° C. to approximately 1,500° C. for a period of time of from approximately 1 to approximately 2 hours; (c) recovering said synthetic refractory sand from the calcined agglomerates; (d) crushing said synthetic refractory sand; and (e) combining said synthetic refractory sand with said carbon bridging agent so as to form said mixture of said carbon bridging agent and said synthetic forsterite-rich sand. In a preferred embodiment, approximately 3 to approximately 4 percent by weight of said synthetic forsterite-rich sand is maghemite.

The invention also relates to the novel refractory materials produced by the process above and to uses of such materials.

It will be noted that the present invention can be used to produce a high-melting refractory material either from asbestos tailings containing serpentine or from a previously calcined product from such tailings which contains enstatite and has a relatively low melting point (fusion temperature) of about 1,600° C. or lower.

The product of the present invention is a synthetic olivine which preferably contains at least 40 percent by volume of forsterite, more preferably at least 60 percent by volume of forsterite, and which optimally consists almost entirely of forsterite with very little or no enstatite (preferably less than 10 percent by volume). The product preferably has a melting (fusion) point of about 1,660° C. or higher, and preferably above about 1,700° C.

A special advantage of the synthetic olivine of the invention is that it is readily useful in a variety of applications where other refractory sands cannot withstand the required operating temperatures, mechanical stresses or holding times. The synthetic olivine of this invention is also free of asbestos fibers, and is essentially nontoxic.

Other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DESCRIPTION OF PREFERRED EMBODIMENTS

Figure 1:
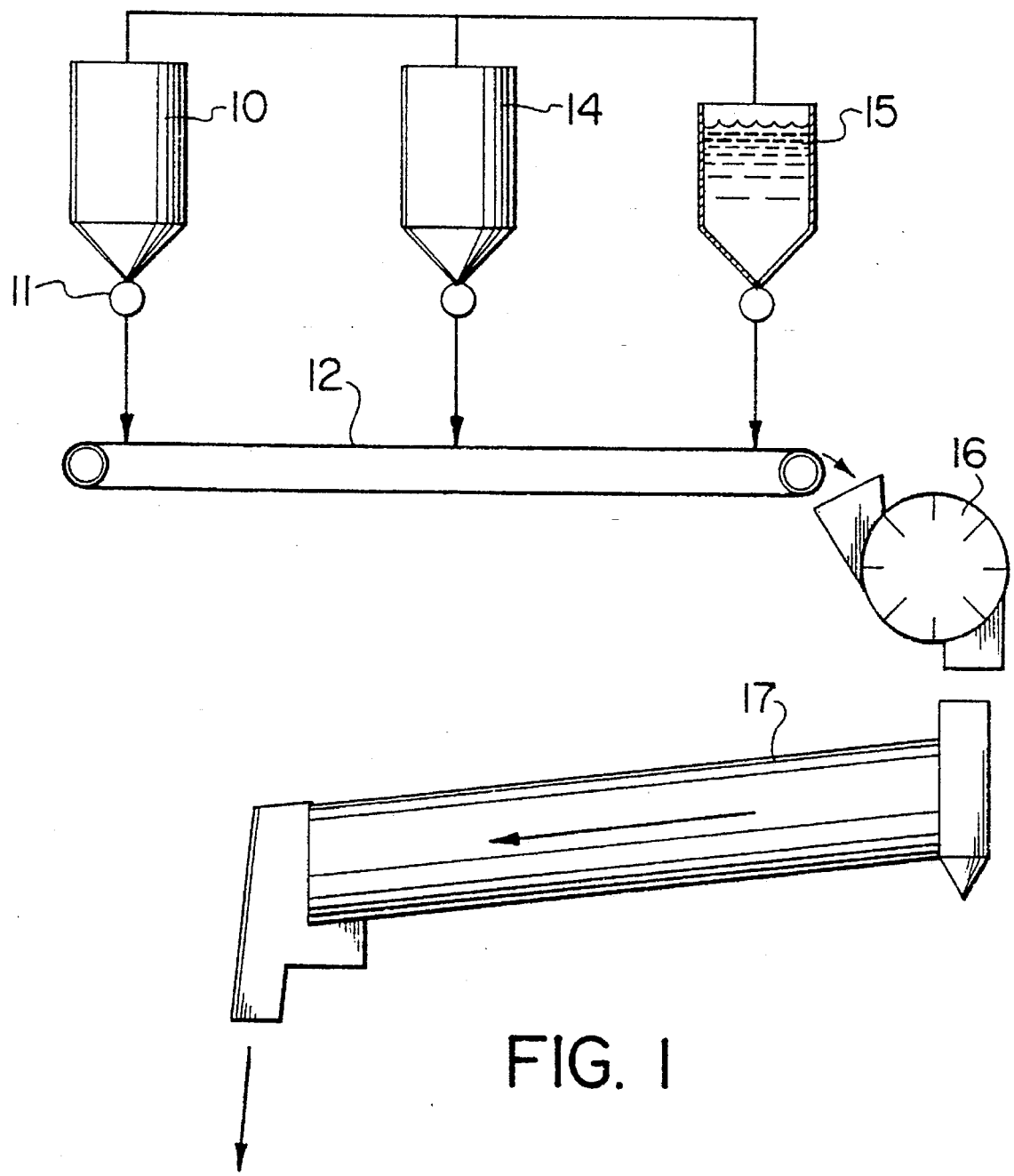
FIG. 1 is a schematic representation of apparatus used in accordance with this invention.

The present invention and the various features and advantageous details thereof are explained more fully with reference to the non-limiting embodiments described in detail in the following description.

In the present invention, a magnesium compound is used during the calcination of asbestos mine tailings, or during the heating of a synthetic enstatite-containing product previously produced by calcining such tailings, at a temperature of about 1,200° C. or higher, in order to produce a synthetic olivine compound which is rich in forsterite ($Mg_2SiO_4$) rather than enstatite ($MgSiO_3$). Preferably, as noted above, this synthetic olivine compound will contain more than 60 percent by volume of forsterite and less than 10 percent by volume of enstatite.

Without wishing to be bound to any particular theory, it is believed that, during the heating or calcining step, the presence of the added magnesium compound prevents the forsterite resulting from reaction (ii) above from degrading, via chemical reaction with free silica, into enstatite by reaction (iii). Alternatively, the free silica produced by reaction (ii) may be made to react with the added magnesium compound instead of reacting with the forsterite according to reaction (iii). Consequently, a forsterite-rich compound is obtained. In other words, it is believed that a forsterite-rich chemical equilibrium is obtained when the reaction of anhydrous magnesium silicate into enstatite is surpassed by the reaction of free silica with magnesium oxide. This is indicated by reaction (iv) shown below:

(iv) reaction of free silica above approximately 1,200° C. with magnesium oxide:

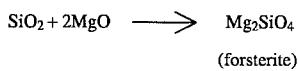

(forsterite)

Alternatively, to achieve similar results, previously calcined asbestos tailings, rich in enstatite, can be heated to a temperature of above 1,200° C. or higher in the presence of suitable amounts of magnesium oxide or a precursor thereof. It is inferred that some enstatite is reacted back into forsterite, and free silica is reacted with magnesium to form additional forsterite.

The precise composition of the product obtained in accordance with the present invention will normally be dependent on the initial index of basicity ($MgO:SiO_2$) weight ratio, referred to as "Ib") of the batch of serpentine used, the amount of magnesium oxide or precursor, the calcining temperatures, and the granulometry of the reactants.

Table 1 below provides typical compositions of tailings from asbestos mines in the Province of Quebec, Canada, and shows the index of basicity (Ib) of these materials.

TABLE 1

Typical Chemistries of Tailings from Chrysotile Mines

| Sample | Ib | Analysis (wt %) | | | | |
|---|---|---|---|---|---|---|
| | | MgO | $SiO_2$ | $FeO,Fe_2O_3$ | $Al_2O_3$ | LOI* |
| Mine 1 | 0.89 | 42.8 | 47.9 | 4.8 | — | 13.0 |
| Mine 2 | 0.90 | 35.2 | 39.2 | 8.8 | 1.2 | 12.1 |
| Mine 3 | 1.22 | 41.4 | 34.0 | 9.2 | 0.4 | 15.0 |
| Mine 4 | 1.25 | 41.6 | 33.2 | 9.1 | 0.7 | 13.8 |
| Example 1 below | 0.99 | 37.2 | 37.7 | 7.5 | 0.8 | 13.7 |
| Theoretical Serpentine | 1.00 | 43.6 | 43.4 | — | — | 13.0 |

*Loss on ignition

The amount of magnesium oxide or precursor required in order to ensure a high percentage of forsterite in the product depends on the initial Ib ratio, which may range from about 0.8 to 1.2. In theory, 100 g of pure serpentine would produce 10.8 g of silica according to reaction (ii) above, which would require the presence of 14.5 g of magnesium oxide for complete reaction with the silica according to reaction (iv). If an excess of magnesium oxide is provided, this is not harmful because it remains unreacted in the product as periclase which itself has a high fusion temperature. In general, therefore, the required amount of MgO is in the range of from 10 percent to 25 percent by weight, and is more preferably at least 15 percent by weight, based on the amount of asbestos tailings. Another way of expressing the amount of MgO required is to state that the Ib of the starting materials (serpentine and MgO or precursor) should preferably be in the range of 1.34 to 1.68.

In carrying out the present process, it is not essential to use magnesium oxide as such since any magnesium compound which yields magnesium oxide under the reaction conditions (i.e., a magnesium oxide precursor) can be employed, such as for example magnesium hydroxide, magnesium carbonate, magnesium sulfate, or other chemical equivalents of magnesium oxide. Naturally, when a magnesium oxide precursor is used, its relative amount should be calculated as magnesium oxide.

At a given $MgO:SiO_2$ (Ib) ratio, the fusion temperature of the calcined product increases in direct proportion to the fineness of the particles of the serpentine starting material, possibly because of better diffusion of the magnesium oxide into the grains of the serpentine (or forsterite-enstatite, if the reaction is carried out on a previously calcined tailings product). The preferred size range of the serpentine (or forsterite-enstatite) is −1.68 mm, in diameter. If necessary, the serpentine starting material maybe subjected to a preliminary grinding step to reduce the particle size as required.

The size of the particles of MgO or precursor is not critical, but these particles are desirably of similar size to the serpentine particles in order to assure good distribution and mixing of the two kinds of materials.

It is preferable to form granular agglomerates of the particles of tailings and the particles of magnesium oxide (or precursor) by mixing these materials together with water and a binder which remains present at reasonably high temperature in order to form a paste and then to make granules from the paste. The binder prevents disintegration of the granules during the calcination step, which could result in loss of the magnesium oxide dust from the calciner and an uneven ratio of MgO to $SiO_2$ in the heated granules. The size and strength of the granules can be controlled by the amount and dilution ratio of the binder in the aqueous solution. Usually, about 3 to 10 percent by weight of the binder solution is required to form suitable granules, and an amount of about 5 percent is normal, depending on the binder chosen. An example of a suitable binder solution is an aqueous solution of $MgSO_4$ having the advantage of being a source of MgO.

The mixture of starting materials employed in the present invention is heated at a temperature of at least 1,200° C., and preferably at a temperature in the range of 1,200° C. to 1,500° C., for a length of time necessary for the desired reactions to reach equilibrium. Ideally, the calcination temperature is around 1,460° C. and the reaction time is usually at least about one hour.

The resulting products, particularly those having Ib ratios over about 1.2, have suitable characteristics with respect to size distribution, packing ability, thermal resistance and sintering properties for utilization as ladle sand or for similar refractory uses.

It is especially desirable to mix the refractory product of the invention with graphite (or other suitable so-called bridging agent) prior to use of the material in refractory applications in particular for use as a steel ladle taphole nozzle sand. The graphite helps the refractory material to form a low thermal conductivity protective sintered crust when exposed to high temperatures. The amount of graphite or other bridging agent is usually in the range of from 5 to 15 percent by weight of the resulting mixture, and more usually from 5 to 10 percent by weight.

The major properties required for ladle sands applications are refractoriness, size distribution, high degree of packing, low thermal expansion, and ability to form a suitable crust in the upper nozzle. The most common conventional sands used as nozzle materials are silica, natural olivine and zircon with fusion points ranging from 1,430° C. to 1,760° C., 1,540° C. to 1,760° C. and 2,040° C. to 2,220° C., respectively. The olivines produced by calcining serpentine with MgO according to the present invention have fusion points ranging upwardly from 1,610° C. to more than 1,680° C. depending on the nature of the composition, and particularly on the $MgO:SiO_2$ (Ib) ratio. Preferably, the fusion points are above 1,660° C.

The high thermal resistance of the synthetic olivine produced according to the present invention in the presence of liquid steel makes it suitable also for other applications in steelmaking, namely, in castables, plastic and fire bricks, and gunning and ramming materials resisting to temperatures over 1,650° C.

The process of the invention may be carried out continuously in an apparatus of the type shown in schematic form in FIG. 1. In this apparatus, asbestos tailings (previously ground to a desired particle size) are fed from a hopper 10 through flow control valve 11 to a conveyor belt 12. The belt then conveys the serpentine particles beneath a stream of magnesium oxide or precursor particles from hopper 14. The resulting powder mixture is then conveyed beneath a stream of an aqueous solution of an inorganic binder from tank 15. The resulting paste-like mixture is deposited in a mixer (granulator) 16 and the emerging granules are fed into the entrance of a downwardly inclined rotary kiln 17 in which the required calcination takes place.

Figure 2:
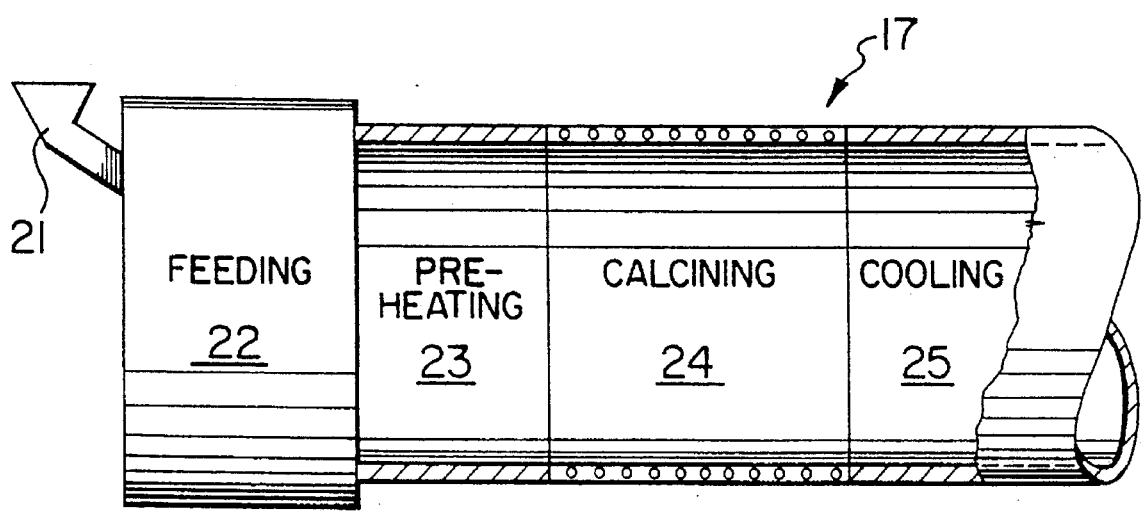
FIG. 2 is an example of a rotary kiln which can be used to carry out the present invention.

The kiln 17 is shown in greater detail in FIG. 2. The granules from mixer 16 are fed to input funnel 21, into feeding zone 22 and proceed to a preheating zone 23. Dehydration of the serpentine begins in the preheating zone 23. The preheated material then proceeds to a static furnace calcining and sintering zone 24 where it reaches a desired temperature in the range of 1,200° to 1,500° C. The calcined material then reaches a cooling zone 25, from which the final product is collected. The material has a residence time in the kiln 17 of about one hour.

EXAMPLES

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Example 1

A test was carried out to determine the effect of the size of raw serpentine particles and of the amount of MgO added to the serpentine on the fusion point of the calcined products.

Heat treatments of various starting materials were carried out in a rotary kiln of the type shown in FIG. 2, subjecting the starting materials to an increasing temperature form ambient to 800° C. in a first step, and then heating was pursued up to 1,350° C. in a static furnace. The total retention time was two hours. In each test, granulation of the serpentine-MgO mixture was employed to prevent kiln loss during the calcination stage. The pellet size and strength were controlled by the amount and dilution ratio of a magnesium sulfate binder in the aqueous solution.

Figure 3:
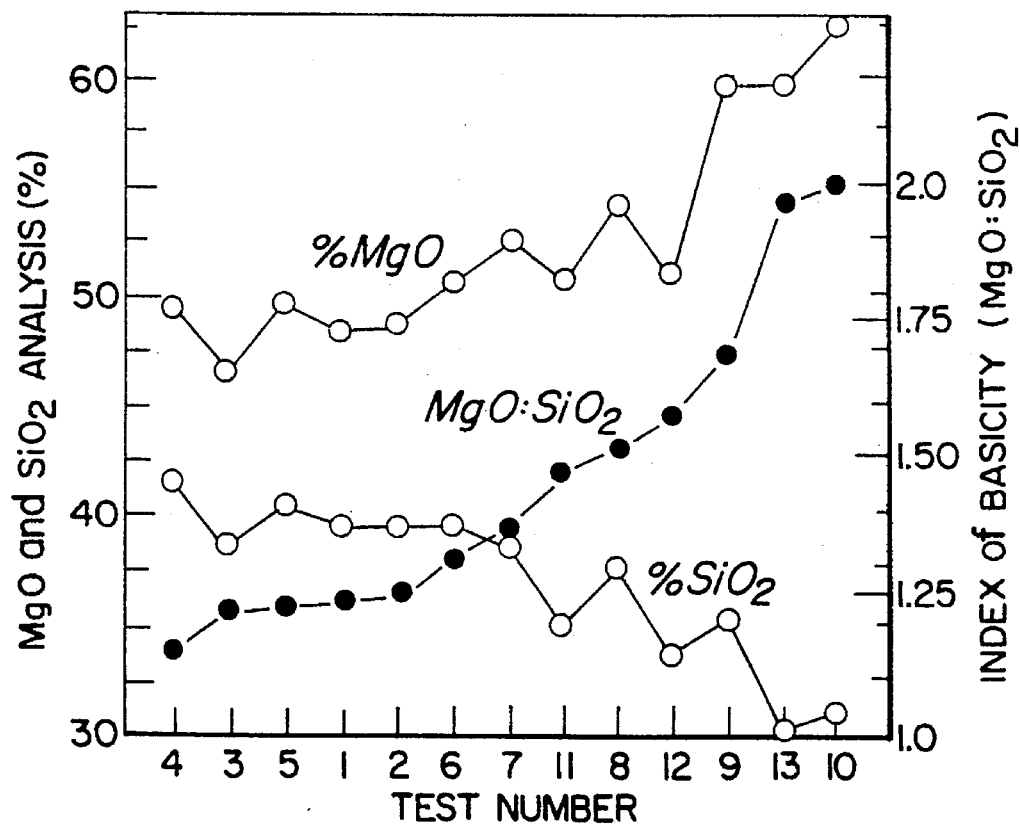
FIG. 3 is a graphical representation of analyses and basicity indices of the synthetic olivine sands obtained in tests carried out in accordance with this invention.

Table 2 shows the composition of the serpentine-MgO mixtures tested, as well as the chemical analyses of the corresponding calcined products and their fusion temperature ($T_f$). Calcining temperatures reached approximately 1,350° C. in the static furnace except as otherwise indicated in Table 2. The temperatures of fusion were measured with a heating microscope calibrated to a maximum reading of 1,680° C. The $MgO:SiO_2$ (Ib) ratio was calculated before and after the heat treatment. The ratio values are plotted in the graph shown in FIG. 3 along with comparative analytical results.

TABLE 2

| | | Composition of the Feed and Products of Calcination | | | | | | |
|---|---|---|---|---|---|---|---|---|
| | Serpentine | Serpentine-MgO Feed Mixtures | | | Olivine Products | | | |
| Test No. | Size (mm) | % MgO* | % $SiO_2$* | Ib | % MgO | % $SiO_2$* | Ib | $T_f$ |
| 1 | −3.36 | 41.1 | 34.9 | 1.18 | 48.5 | 39.62 | 1.24 | 1610 |
| 2 | −1.68 | 41.6 | 34.2 | 1.22 | 48.6 | 39.0 | 1.25 | 1670 |
| 3 | −0.84 | 41.9 | 35.4 | 1.18 | 46.2 | 38.0 | 1.22 | 1680 |
| 4 | −1.68 | 39.9 | 34.9 | 1.14 | 48.9 | 42.7 | 1.15 | 1625 |
| 5 | −1.68 | 44.0 | 36.3 | 1.21 | 49.4 | 40.4 | 1.22 | 1660 |
| 6 | −1.68 | 46.5 | 35.5 | 1.31 | 51.1 | 38.9 | 1.31 | >1680** |
| 7 | −1.68 | 47.0 | 34.6 | 1.36 | 52.3 | 38.3 | 1.37 | >1680** |
| 8 | −1.68 | 48.0 | 33.2 | 1.44 | 56.9 | 36.9 | 1.51 | >1680 |
| 9 | −1.68 | 50.8 | 31.3 | 1.62 | 59.1 | 35.0 | 1.69 | >1680*** |
| 10 | −1.68 | 53.6 | 29.5 | 1.82 | 62.6 | 31.1 | 2.01 | >°1680**** |
| 11 | −1.68 | 47.6 | 32.1 | 1.48 | 51.0 | 34.7 | 1.47 | >1680 |
| 12 | −1.68 | 50.5 | 30.3 | 1.67 | 51.7 | 33.0 | 1.57 | >1680 |
| 13 | −1.68 | 53.3 | 28.6 | 1.86 | 59.3 | 30.2 | 1.96 | >>1680 |

*Calculated from the head analyses of the mixed serpentine and magnesium oxide.
**These two products started to soften at 1,680° C.
***Calcining temperature reaching 1,425° C.
****Calcining temperature reaching 1,460° C.

Figure 4:
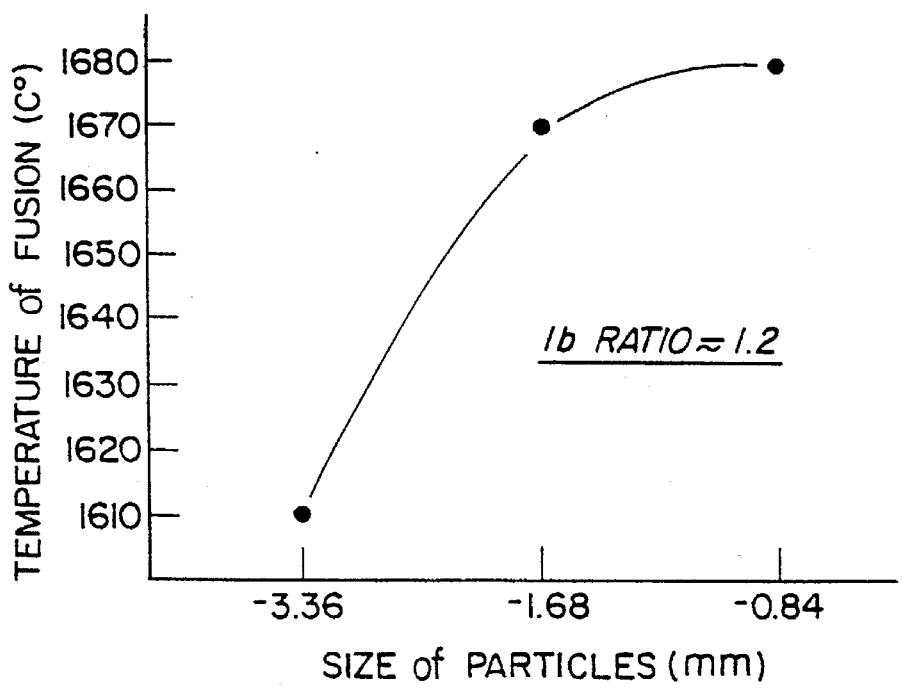
FIG. 4 is a graphical representation of the effect of particle sizes on the fusion points of the synthetic olivine sands obtained in accordance with this invention.

FIG. 4 shows the relationship between the serpentine particle size and the fusion temperature of the resulting products. The graph shows that, at a given $MgO:SiO_2$ ratio (1.2 in this case), the fusion temperature of the calcined product increases with the fineness of the raw serpentine. Since pure forsterite has an $MgO:SiO_2$ ratio of 1.34 with a fusion temperature of 1,890° C., it is significant that any compositions having a higher $MgO:SiO_2$ ratio have resulting fusion temperatures greater than 1,680° C. (which was the highest detectable limit of the heating microscope used in this Example).

Figure 5:
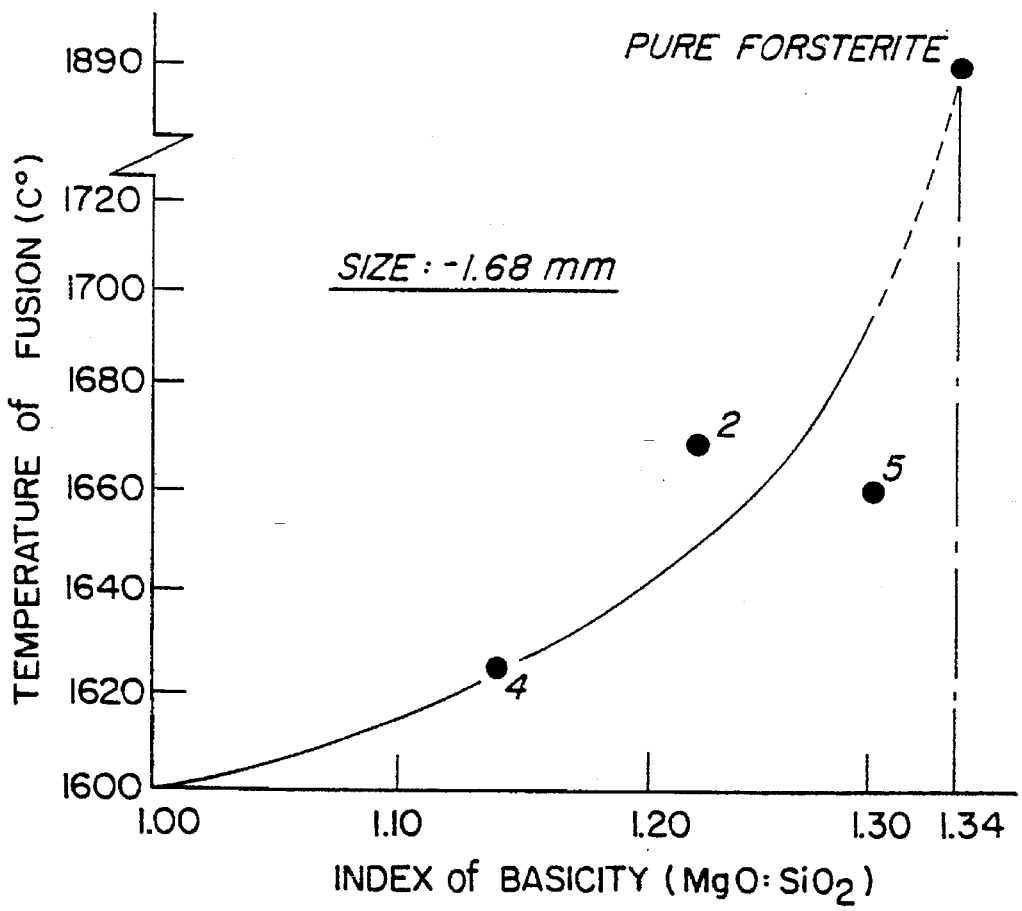
FIG. 5 is a graphical representation of the effect of the basicity indices on the fusion points of synthetic olivine sands obtained in accordance with this invention.

The effect of the amounts of MgO additions on the fusion temperatures of the products is graphically illustrated in FIG. 5.

Example 2

This Example shows the testing of forsterite-rich synthetic olivine produced according to the present invention as ladle sand for a steel slide-gate system.

Three synthetic olivine blended products according to the invention were prepared and tested for their thermal resistance to liquid steel at high temperature for extended periods. These products are identified in Table 3 with the corresponding basicity index and major mineralogical components.

TABLE 3

Blended Products to be Tested as Ladle Sand

| Blended Product | Source** | $MgO:SiO_2$ (Ib) | $T_f$ °C. | Minerals Identified (Approx. Content) |
|---|---|---|---|---|
| No. 1 | Tests 2 and 5 | 1.22 | 1665 | Principal: Forsterite ($Mg_2SiO_4$) Major: Enstatite ($MgSiO_3$) Minor: Iron Oxides* Magnesioferro peroxene $(Fe,Mg)SiO_3$) |
| No. 2 | Tests 6, 7, 8 and 11 | 1.39 | >1680 | Principal: Forsterite Minor: Iron Oxides* Magnesioferro peroxene Enstatite Periclase (MgO) |
| No. 3 | Tests 9 and 12 | 1.64 | >>1680 | Principal: Forsterite Major: Periclase (MgO) Minor: Iron Oxides* Magnesioferro peroxene |

*Maghemite ($Y—Fe_2O_3$), hematite ($Fe_2O_3$), magnesioferrite ($MgFe_2O_4$)
**Test numbers refer to test numbers in Example 1.
Note: No silica ($SiO_2$) was identified in the products.

A proper grain size distribution insures high packing. The sand, therefore, should report on several successive screens in order to avoid too many interstices between the grains. Table 4 shows a comparison of the size of the forsteritic olivines of this invention with other types of sands.

TABLE 4

Comparative Screen Tests of Ladle Sands

| Size Wt. % | US Screen mm | 16 1.18 | 20 0.84 | 30 0.60 | 40 0.42 | 50 0.30 | 70 0.21 | 100 0.15 | 200 0.08 | −200 0.08 |
|---|---|---|---|---|---|---|---|---|---|---|
| Silica sand | | 15 | 53 | 31 | 3 | — | — | — | — | — |
| Natural Olivine | | — | — | — | — | 26 | 35 | 26 | 9 | 4 |
| Zircon sand | | — | — | — | 3 | 3 | 4 | 47 | 41 | 1 |
| Product No. 1 | | 19 | 20 | 15 | 12 | 9 | 8 | 8 | 6 | 3 |
| Product No. 2 | | 27 | 23 | 13 | 11 | 8 | 6 | 7 | 3 | 2 |
| Product No. 3 | | 20 | 18 | 14 | 16 | 11 | 7 | 5 | 5 | 4 |

Other physical characteristics of the olivine sands assure good packing qualities. These characteristics are, namely, specific gravity, bulk density, and percentage of void volume. Table 5 shows such physical characteristics for each of the synthetic olivines.

TABLE 5

Physical Properties of Synthetic Forsterite-Rich Sands

| Product | Specific Gravity | Bulk Density | Void Volume % |
|---|---|---|---|
| No. 1 | 2.93 | 1.46 (91 lb./ft.$^3$) | 50.2 |
| No. 2 | 2.86 | 1.56 (99 lb./ft.$^3$) | 49.8 |
| No. 3 | 2.82 | 1.40 (87 lb./ft.$^3$) | 46.8 |

Both the relatively high specific gravity and a semi-angular shape of the olivine products have resulted in good free-flowing material.

Finally, two other factors making the novel sands suitable for taphole nozzle are a low thermal expansion coefficient ($1.09 \times 10^{-5}$) and high hardness (5.5 on Mohs scale) for all three olivine products.

In contact with liquid steel, a satisfactory ladle sand must form a low thermal conductivity layer, known as a crust, at the top of the nozzle. This crust is broken by the static pressure of steel when the sliding gate is opened to tap the furnace. Sintering is obtained either from natural occurrence, such as by the presence of feldspar in silica sands, or by making admixtures to this effect, e.g., via additives like graphite to chromite, silica to zircon, etc. The latter combination produces a glassy bridge at about 1,540° C. by the melting of free silica and the decomposition of zircon into zirconia and silica.

Figure 6:
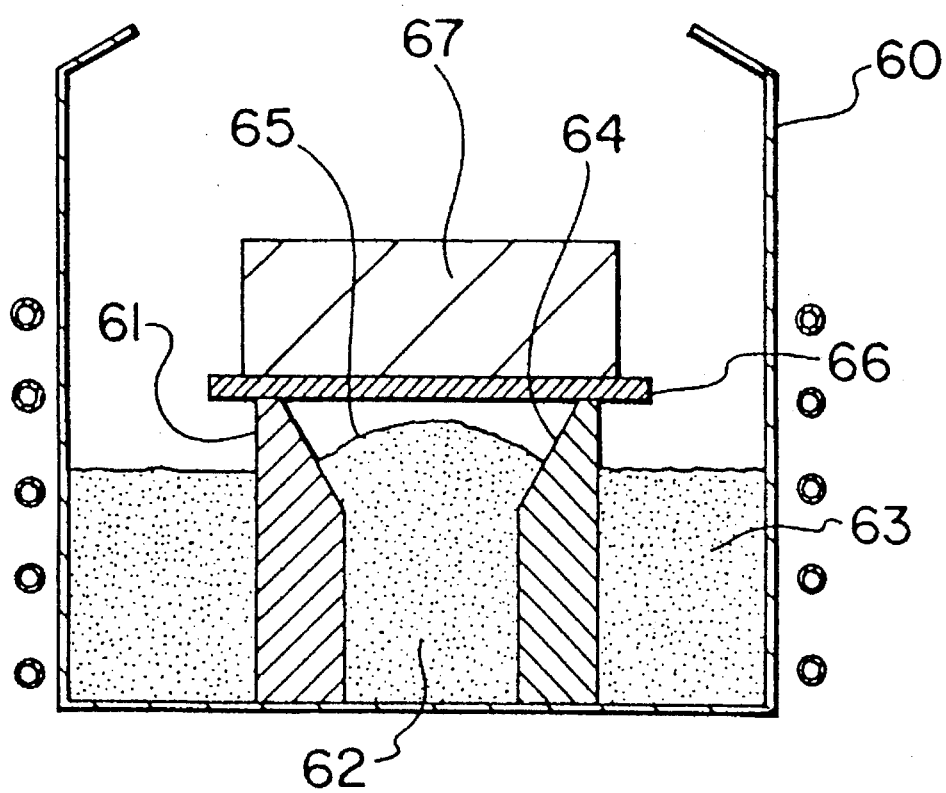
FIG. 6 is a schematic cross-section of one possible application of the synthetic olivine sands of this invention in an industrial setting.

As illustrated in FIG. 6, to assess the suitability of the synthetic olivine products as ladle sands, tests were conducted in an electrical induction furnace 60 having no rapping hole at the bottom. A refractory mold 61, filled up with an olivine-graphite mixture 62 (containing 10 percent graphitic carbon), was installed at the bottom of the furnace and was surrounded with rammed mullite 63 (to avoid side heat transfer). The refractory mold 61 had a conical section 64 in its upper section and the sand was heaped into a "flower pot" topping 65 in this conical section. The top surface of the sand was protected by a steel plate 66 over which was placed a 25 kg steel ingot 67.

Figure 7:
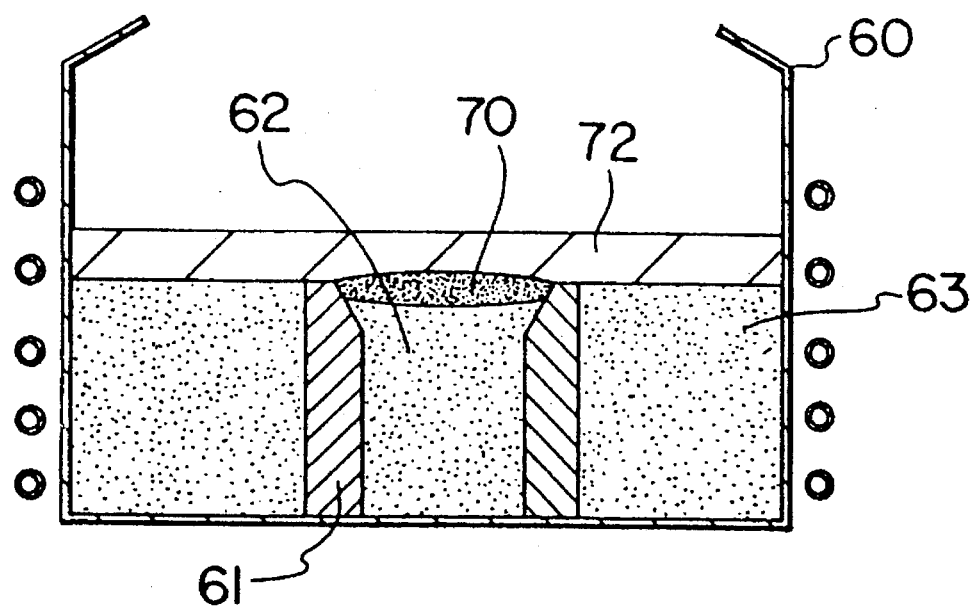
FIG. 7 is a schematic example of a cross-section of the synthetic olivine sands of FIG. 6 during a smelting process.

The metal was melted and maintained at pre-selected temperatures, i.e., 1,600° C., 1,650° C. and 1,700° C., for periods of time varying from one to two hours as schematically illustrated in FIG. 7.

Since the thickness of a crust 70 formed at the top of the refractory bed 62 depended on the temperature of the liquid steel 72 and the contact period between the liquid metal and the ladle sand, the two factors were investigated simultaneously by increasing both the temperature and the length of time as shown in Table 6.

TABLE 6

Conditions of Nozzle Testing with Forsteritic Olivine

| Product No. | Liquid Steel °C. | Contact Period (hrs.) |
|---|---|---|
| 1 | 1,600 | 1 |
| 2 | 1,650 | 1½ |
| 3 | 1,700 | 2 |

After the test was completed, the furnace 60 was tilted and the liquid steel poured. The refractory crust 70 formed at the interphase between the olivine-graphite sand 74 and the liquid steel 72 was sufficient to retain the unaltered olivine-graphite sand 74 in the mold, which was pulled out for examination. It was found in every test that the crust 70 was thin enough to be easily broken by a small rod. This indicated that the sintered layer would break under the pressure of the liquid steel in an industrial sliding-gate system.

Example 3

Five tests were carried out in which serpentine tailings were heated with magnesia precursors $MgCO_3$ and $MgSO_4$. The conditions and results are shown in Tables 7 and 8 below.

TABLE 7

Granulometry, Composition and Basicity Index of Serpentine, Additives and Resulting Mixtures

| Sample Granulo- metry | Test No. | Asbestos Tailings Analysis (dry) % | | | | Additives (weight) % | | Serpentine-MgO— $MgSO_4$ Mixtures | | | |
|---|---|---|---|---|---|---|---|---|---|---|---|
| | | | | | | MgO Present in $MgCO_3$ | $MgSO_4$ Solution | Analysis (dry) % | | | MgO: $SiO_2$ (Ib) |
| | | MgO | $SiO_2$ | $Fe_2O_3$ | Ib | | | MgO | $SiO_2$ | $Fe_2O_3$ | |
| (−1.68 mm) | 12 | 39.0 | 39.0 | 5.9 | 1.00 | 12.2 | 5.0 | 46.5 | 34.2 | 5.2 | 1.36 |
| | 13 | 39.0 | 39.0 | 5.9 | 1.00 | 16.6 | 5.0 | 49.1 | 32.5 | 4.9 | 1.51 |
| | 14 | 39.0 | 39.0 | 5.9 | 1.00 | 21.3 | 5.0 | 52.0 | 30.7 | 4.6 | 1.69 |
| | 15 | 39.0 | 39.0 | 5.9 | 1.00 | 16.6 | 5.0 | 49.1 | 32.5 | 4.9 | 1.51 |
| | 16 | 39.0 | 39.0 | 5.9 | 1.00 | 16.6 | 6.0 | 49.1 | 32.5 | 4.9 | 1.51 |

TABLE 8

Thermal Treatment Conditions, Analysis of Olivine Product and measurements of critical temperatures

| Sample Granul- ometry | Test No. | Calcination Temperature (°C.) | | Olivines Products Analysis (%) | | | | Temperatures (°C.) | |
|---|---|---|---|---|---|---|---|---|---|
| | | Stage 1 | Stage 2 | MgO | $SiO_2$ | $Fe_2O_3$ | Ib | Softening | Fusion |
| (−1.68 m) | 12 | 800 (1h) | 1350 (1h) | 47.7 | 37.6 | 8.0 | 1.27 | 1680 | >1680 |
| | 13 | 800 (1h) | 1350 (1h) | 48.6 | 35.0 | 7.6 | 1.39 | >1680 | >1680 |
| | 14 | 800 (1h) | 1350 (1h) | 50.0 | 33.7 | 7.5 | 1.48 | >1680 | >1680 |
| | 15 | 800 (1h) | 1405 (1h) | 49.4 | 36.0 | 6.8 | 1.37 | >1680 | >1680 |
| | 16 | 800 (1h) | 1460 (1h) | 50.8 | 35.0 | 6.0 | 1.46 | >1680 | >1680 |

Example 4

Seven samples were produced according to the process of the invention and analyzed for the content of various mineral phases. The results are shown in Tables 9 and 10 below.

TABLE 9

Analyses of the X-ray Powder-Diffraction Patterns
Gives the Following Uncorrected Compositions
(expressed as volumetric percentages):

| Phase | ICDD # | 1. | 2. | 3. | 4. | 5. | 6. | 7. |
|---|---|---|---|---|---|---|---|---|
| forsterite | 34-189 | 87 | 86 | 96 | 97 | 93 | 91 | 86 |
| enstatite | 31-634 | — | — | 11 | 14 | 9 | 51 | 34 |
| periclase | 4-829 | 40 | 59 | 91 | 32 | 26 | — | 21 |
| maghemite-C | 39-1346 | 49 | 72 | 34 | 26 | 16 | 44 | 80 |
| protoenstatite | 3-523 | 15 | 14 | — | — | — | — | — |
| magnesium silicate | 11-273 | — | — | — | — | — | 41 | — |
| quartz | 5-490 | — | — | — | — | — | — | 9 |

Correcting these figures for the respective $I/I_c$ ratios, and normalizing, gives the following quantitative compositions:

TABLE 10

| Phase | ICDD # | 1. | 2. | 3. | 4. | 5. | 6. | 7. |
|---|---|---|---|---|---|---|---|---|
| forsterite Mg$_2$SiO$_4$ | 34-189 | 65 | 58 | 66 | 75 | 81 | 52 | 54 |
| enstatite (Fe$_2$Mg)SiO$_3$ | 31-634 | — | — | 5 | 7 | 5 | 19 | 14 |
| periclase MgO | 4-829 | 8 | 10 | 16 | 7 | 6 | — | 4 |
| maghemite-C Fe$_2$O$_3$ | 39-1346 | 20 | 26 | 13 | 11 | 8 | 14 | 27 |
| Proto-enstatite MgSiO$_3$ | 3-523 | 8 | 6 | — | — | — | — | — |
| magnesium silicate MgSiO$_3$ | 11-273 | — | — | — | — | — | 15 | — |
| quartz SiO$_2$ | 5-490 | — | — | — | — | — | — | 1 |
| Total | | 100 | 100 | 100 | 100 | 100 | 100 | 100 |
| Ib ratio | | 1.27 | 1.39 | 1.48 | 1.48 | 1.48 | 1.48 | 1.48 |

Example 5

Additional samples were produced according to the process of the present invention and analyzed for the quantitative content of the various mineral phases. The additional samples were obtained using asbestos tailings from the Thetford Mines and Black Lake region of the Province of Quebec, Canada. For these additional experiments, more precise instrumentation was used and more accurate quantitative contents of the various mineral phases were used. The results were statistically analyzed to provide the following ranges of quantitative contents of the mineral phases shown in Table 11. Table 12 shows the chemical analysis for the same additional samples.

TABLE 11

Mineral Analysis of Forsterite-Rich Sand and Nozzle Sand

| Minerals | Forsterite-rich sand (% wt) | Nozzle sand = forsterite-rich sand + carbon (% wt.) |
|---|---|---|
| Forsterite (Mg$_2$SiO$_4$) | 50–60 | 45–55 |
| Periclase (MgO) | 25–35 | 22–32 |
| Enstatite (MgSiO$_3$) | 5–10 | 4–9 |
| Maghemite (Hematite) (Fe$_2$O$_3$) | 3–4 | 3–4 |
| Carbon | traces | 5–15 |
| Remainder | 1–3 | 1–3 |
| TOTAL | ~100 | ~100 |

TABLE 12

Chemical Analysis of Forsterite-Rich Sand and Nozzle Sand

| Chemical Elements | Forsterite-rich sand (% wt) | Nozzle sand = forsterite-rich sand + carbon (% wt.) |
|---|---|---|
| MgO | 60–65 | 54–60 |
| SiO$_2$ | 28–30 | 25–27 |
| Fe$_2$O$_3$ | 3–4 | 3–4 |
| Al$_2$O$_3$ | 0.5–1.0 | 0.5–1.0 |
| Carbon | traces | 5–15 |
| Remainder | 0.7–1.3 | 0.6–1.2 |
| TOTAL | ~100 | ~100 |

It has been found that depending on the initial composition of asbestos tailings used in the process of the present invention, the maghemite (hematite) content of the resulting forsterite-rich refractory sand can vary from approximately 3 to approximately 27 weight percent. This later range is shown in Table 9, Table 10 and Table 11. In Table 11, after numerous experiments, it is shown that the average maghemite (hematite) content of the resulting forsterite-rich refractory sand is from approximately 3 to approximately 4 weight percent and the forsterite content is from approximately 50 to approximately 60 weight percent.

All the disclosed embodiments are useful in conjunction with refractories such as are used for the purpose of taphole nozzle refractory sand, or the like. There are virtually innumerable uses for the present invention, all of which need not be derailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. For example, the individual components need not be derived from the disclosed materials, but could be fabricated from virtually any suitable materials.

Numerous modifications and variations of the present invention may be made, in light of the above teachings, without departing from the basic spirit of the present invention. Accordingly, it will be appreciated by those skilled in the art that, within the scope of the appended claims, the invention may be practiced otherwise than as specifically described herein.

It is intended that the appended claims cover all such additions, modifications and rearrangements. Expedient embodiments of the present invention are differentiated by the appended subclaims.

What is claimed is:

1. A synthetic forsterite-rich refractory sand composition for use as a taphole nozzle refractory sand for a sliding gate system of a steel ladle, said synthetic forsterite-rich sand composition comprising a mixture, said mixture comprising:
   a) a carbon bridging agent, said carbon bridging agent being present in said mixture in a proportion of from 5 to 15 percent by weight of said mixture; and
   b) a synthetic forsterite-rich sand, said synthetic forsterite-rich sand being free-flowing, having a $MgO:SiO_2$ weight ratio of at least 1.2, a specific gravity of approximately 3 $g/cm^3$, a void volume of less than approximately 50 percent by volume of said synthetic forsterite-rich sand, and a fusion point of at least 1610° C., wherein
      i) at least 50 percent by weight of said synthetic forsterite-rich sand is forsterite, and
      ii) from 3 to 27 percent by weight of said synthetic forsterite-rich sand is maghemite.

2. The synthetic forsterite-rich refractory sand composition of claim 1, wherein from 3 to 8 percent by weight of said synthetic forsterite-rich sand is maghemite.

3. The synthetic forsterite-rich refractory sand composition of claim 1, wherein from 3 to 4 percent by weight of said synthetic forsterite-rich sand is maghemite.

4. The synthetic forsterite-rich refractory sand composition of claim 3, wherein said $MgO:SiO_2$ weight ratio is from 1.27 to 1.48.

5. The synthetic forsterite-rich refractory sand composition of claim 3, wherein said carbon bridging agent comprises graphitic carbon.

6. The synthetic forsterite-rich refractory sand composition of claim 1, wherein said $MgO:SiO_2$ weight ratio is from 1.27 to 1.48.

7. The synthetic forsterite-rich refractory sand composition of claim 1, wherein said carbon bridging agent comprises graphitic carbon.

8. The synthetic forsterite-rich refractory sand composition of claim 1, wherein said synthetic refractory sand has irregularly shaped grains.

9. The synthetic forsterite-rich refractory sand composition of claim 1, wherein from 50 to 60 percent by weight of said synthetic forsterite-rich sand is forsterite.

10. A synthetic forsterite-rich refractory sand composition comprising a mixture, said mixture including:
    a) a carbon bridging agent, said carbon bridging agent being present in said mixture in a proportion of from approximately 5 to approximately 15 percent by weight of said mixture; and
    b) a synthetic forsterite-rich sand, said synthetic forsterite-rich sand being free-flowing, having a $MgO:SiO_2$ weight ratio of at least approximately 1.2, a specific gravity of approximately 3 $g/cm^3$, a void volume of less than approximately 50 percent by volume of said synthetic forsterite-rich sand, and a fusion point of at least approximately 1610° C., wherein
       i) at least approximately 50 percent by weight of said synthetic forsterite-rich sand is forsterite, and
       ii) from approximately 3 to approximately 27 percent by weight of said synthetic forsterite-rich sand is maghemite.

11. The synthetic forsterite-rich refractory sand composition of claim 10, wherein from approximately 3 to approximately 8 percent by weight of said synthetic forsterite-rich sand is maghemite.

12. The synthetic forsterite-rich refractory sand composition of claim 10, wherein from approximately 3 to approximately 4 percent by weight of said synthetic forsterite-rich sand is maghemite.

13. The synthetic forsterite-rich refractory sand composition of claim 12, wherein said $MgO:SiO_2$ weight ratio is from approximately 1.27 to approximately 1.48.

14. The synthetic forsterite-rich refractory sand composition of claim 12, wherein said carbon bridging agent comprises graphitic carbon.

15. The synthetic forsterite-rich refractory sand composition of claim 10, wherein said carbon bridging agent comprises graphitic carbon.

16. The synthetic forsterite-rich refractory sand composition of claim 10, wherein said $MgO:SiO_2$ weight ratio is from approximately 1.27 to approximately 1.48.

17. The synthetic forsterite-rich refractory sand composition of claim 10, wherein said synthetic refractory sand has irregularly shaped grains.

18. The synthetic forsterite-rich refractory sand composition of claim 10, wherein from approximately 50 to approximately 60 percent by weight of said synthetic forsterite-rich sand is forsterite.

19. A process for producing a synthetic refractory sand composition having a mixture of a carbon bridging agent and a synthetic forsterite-rich sand, said carbon bridging agent being present in said mixture in a proportion of from approximately 5 to approximately 15 percent by weight of said mixture, said synthetic refractory sand being free-flowing, including i) at least approximately 50 percent by weight forsterite and ii) from approximately 3 to approximately 27 percent by weight maghemite, and having i) a $MgO:SiO_2$ weight ratio of at least approximately 1.2, ii) a specific gravity of approximately 3 $g/cm^3$, iii) a void volume of less than approximately 50 percent and iv) a fusion point of at least approximately 1,610° C., said process of producing a synthetic refractory sand composition comprising the steps of:
    (a) agglomerating to form agglomerates
       1) mixture comprising
          i) a particulate starting material selected from the group consisting of serpentine-containing asbestos tailings and an enstatite-containing product produced by calcining a serpentine-containing product, said serpentine-containing product being produced by calcining serpentine-containing asbestos tailings and
          ii) from approximately 10 to approximately 25 percent, based on the total weight of mixture, of magnesium oxides or precursors of magnesium oxides with
       2) an aqueous binder solution:
    (b) calcining said agglomerates at a temperature of from approximately 1,200° C. to approximately 1,500° C. for a period of time of from approximately 1 to approximately 2 hours;
    (c) recovering said synthetic refractory sand from the calcined agglomerates;
    (d) crushing said synthetic refractory sand; and
    (e) combining said synthetic refractory sand with said carbon bridging agent so as to form said mixture of said carbon bridging agent and said synthetic forsterite-rich sand.

20. The process according to claim 19, wherein said aqueous binder solution is present in a proportion of from approximately 3 to approximately 10 percent by weight of said mixture.

* * * * *

UNITED STATES PATENT AND TRADEMARK OFFICE
CERTIFICATE OF CORRECTION

PATENT NO.   : 5,576,255
DATED        : November 19, 1996
INVENTOR(S)  : Huard et al.

It is certified that error appears in the above-identified patent and that said Letters Patent is hereby corrected as shown below:

Column 1, on or around printer line number 39, "$(Fe_2O_3Fe_3-O_4)$" should be --$(Fe_2O_3-Fe_3O_4)$--.

Column 2, on or around printer line number 4, "$3MgO.2SiO_2$" should be --$3MgO \cdot 2SiO_2$--.

Column 2, on or around printer line number 13,

"$(3\ MgO.2SiO_2)$" should be --$(3MgO \cdot 2SiO_2)$--.

In Table 2, for Test No. 6, "$>1680^{**}$" should be --$>1680^*$--.

In Table 2, for Test No. 10, "$>°1680^{**}$" should be --$>>1680^{**}$--.

Column 9, on or around printer line 6, the term "Since" should begin a new paragraph.

Column 16, on or around printer line number 38, "mixture" should be --a mixture--.

Signed and Sealed this

Eighteenth Day of March, 1997

BRUCE LEHMAN

Attest:

Attesting Officer

Commissioner of Patents and Trademarks